United States Patent
Politi

(10) Patent No.: US 8,590,818 B2
(45) Date of Patent: Nov. 26, 2013

(54) DRY GRANULATION IN A GAS STREAM

(75) Inventor: Giovanni Politi, Ariccia (IT)

(73) Assignee: Polibiotech SRL, Rome (IT)

( * ) Notice: Subject to any disclaimer, the term of this patent is extended or adjusted under 35 U.S.C. 154(b) by 194 days.

(21) Appl. No.: 13/127,865

(22) PCT Filed: Nov. 4, 2009

(86) PCT No.: PCT/IT2009/000498
§ 371 (c)(1),
(2), (4) Date: May 5, 2011

(87) PCT Pub. No.: WO2010/052748
PCT Pub. Date: May 14, 2010

(65) Prior Publication Data
US 2011/0220745 A1 Sep. 15, 2011

(30) Foreign Application Priority Data
Nov. 5, 2008 (IT) .............................. RM2008A0596

(51) Int. Cl.
*B02C 19/00* (2006.01)
*B02C 21/00* (2006.01)
*B02C 23/00* (2006.01)

(52) U.S. Cl.
USPC ............... 241/18; 241/19; 241/62; 241/152.2

(58) Field of Classification Search
USPC .................. 241/18, 19, 47, 157, 152.2, 62, 57
See application file for complete search history.

(56) References Cited

U.S. PATENT DOCUMENTS

| | | | | |
|---|---|---|---|---|
| 3,601,321 A | * | 8/1971 | Barth et al. .................... 241/3 |
| 4,353,709 A | * | 10/1982 | Nioh et al. ............... 23/313 FB |
| 4,353,730 A | * | 10/1982 | Kinno et al. ...................... 71/29 |
| 4,370,198 A | * | 1/1983 | Dencs et al. .................. 159/48.1 |
| 4,428,894 A | * | 1/1984 | Bienvenu ........................ 75/335 |
| 4,591,324 A | * | 5/1986 | Kubota ......................... 425/222 |
| 4,946,654 A | * | 8/1990 | Uhlemann et al. ............ 422/140 |
| 5,316,735 A | * | 5/1994 | Ivanov et al. ................. 422/143 |
| 8,052,999 B2 | * | 11/2011 | Politi et al. .................... 424/489 |
| 2003/0068367 A1 | | 4/2003 | Sowden et al. |
| 2003/0187167 A1 | * | 10/2003 | Adams et al. ................. 526/240 |
| 2008/0173738 A1 | * | 7/2008 | Montag .............................. 241/5 |

FOREIGN PATENT DOCUMENTS

| | | |
|---|---|---|
| GB | 1 567 204 A | 5/1980 |
| WO | 99/11261 A1 | 3/1999 |
| WO | 02/094258 A1 | 11/2002 |
| WO | 2008/056021 A2 | 5/2008 |

OTHER PUBLICATIONS

International Search Report, dated Oct. 5, 2010, from corresponding PCT application.

* cited by examiner

*Primary Examiner* — Faye Francis
(74) *Attorney, Agent, or Firm* — Young & Thompson

(57) ABSTRACT

An apparatus wherein the gas enters from an opening 4 located in a part of a compaction chamber 3 and is dragged through a granulator 5, a fractioning device 12, a special cyclone 11 and a filter system 8A to a suction fan, which creates a gas stream. In such apparatus the bulk to be compacted 1, the fine particles to be compacted again and the compacted bulk have the same flow direction than the carrier gas. Due to its complete or partial impermeability, the structure of the apparatus makes also possible the use of a gas different from normal air. This is important when the bulk is sensible to oxygen.

24 Claims, 5 Drawing Sheets

DRY GRANULATION IN A GAS STREAM

FIELD OF THE INVENTION

Figure 1A:
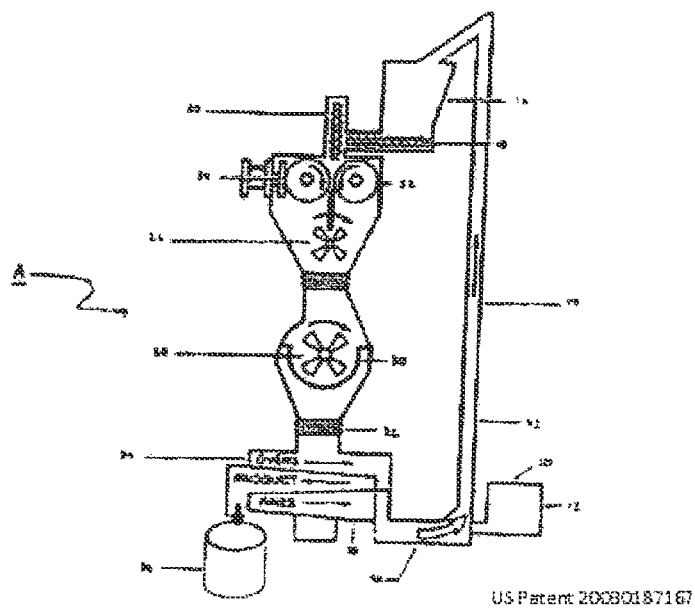

The present invention relates to a method and apparatus for producing granules in a basically dry environment utilizing a suitably guided gas stream. More particularly, the present invention relates to the production of granules that can be profitably used for enhancing and controlling some important qualities of the tablets (especially disintegration and dissolution).

The system proposed in this invention has been developed above all for pharmaceutical purposes (preparation of granules to be compressed into tablets or to be used to fill capsules, improvement of physical characteristics of APIs/excipients to be processed separately or simply to solve the problems related to some particular pharmaceutical formulation), but it can also be used in chemical and in food industry (particularly, preparation of granules for nutraceutical products, foods, suspensions, solutions and so on).

In this description we will consider mostly the use of this invention in the pharmaceutical industry, for the preparation of granules to be compressed into tablets.

BACKGROUND OF THE INVENTION

As it is known in the art, in order to get uniform acceptable tablets, the bulk to be tabletted must be homogeneous, does not segregate during tabletting process and must have good flow-ability properties. This is the most common reason why the granulation is used.

Depending on the quality of the API and on the used excipients, the granulation regards all the bulk to be tabletted (except the lubricants, which have generally to be added apart) or only a part of the materials used in the formulation.

Not many years ago the most used granulation system was the so called wet granulation.

Wet granulation (e.g. fluid bed granulation or granulation in a high shear mixer) requires the use of water and/or alcohol and (especially in the old times) the use of substances like methanol, isopropanol, methylene choride etc.

The results of wet granulations were (and still are) often very good from the point of view of reduction of dust and bulk size, granules flow-ability, bulk homogeneity. Sometimes, even the compressibility of the bulk into tablets has improved very much thanks to the wet granulation techniques.

However, serious problems could become visible with the stability of some wet processes (which means also difficulties in the validation of the processes) and with the quality of the tablets (shelf-life, hardness, disintegration time and so on). This is also because the final moisture content of the granulated bulk is often different from the total moisture content of the non granulated bulk. Furthermore, the results (quality of the granules: flow-ability, homogeneity, porosity and particle size distribution) for small batches (pilot-batches) are often different from the results of the production batches. This derives from the fact that it is very difficult to scale-up a wet granulation process, due to the number of parameters which have influence on the results of the granulation.

A tablet formulation, where the dry bulk (i.e. API and excipients) can be compressed into tablets without previous granulation, is a target and a challenge for the Pharmaceutical industry. In fact such so called direct compression process is theoretically the best possible (above all for economical reasons). However the direct compression is not applicable to many processes, due especially to the fact that many times the APIs are composed of very small and badly flowing particles while the excipients can have a good flow-ability. This fact can cause segregation at the tabletting stage.

When direct compression is not possible or difficult to handle, dry granulation is a valid alternative.

A dry granulation process is described in the art as a method where the powders to be granulated are first mixed (if necessary) and then densified e.g.—in the case of roll compaction—by passing them between two rotating rolls. The ribbons or flakes resulting from such compaction are then broken into granules by passing the ribbons/flakes through a flake breaker and/or through a sieve granulator.

A lot of devices have been created in order to feed homogeneously the compaction rollers or other densification devices, to avoid the formation of dust in the sieve granulator, to control the compaction force, in order to have an uniform ribbon, and to avoid an over compaction (which can have a bad influence also on the dissolution rate of the tablets . . . ) etc. Nevertheless, as result of a normal dry granulation (for instance roll compaction), the produced granulated bulk is not generally homogeneous, because of the contemporary presence in it of big (1-2 mm of diameter) depending on the size of the sieve openings in the sieve granulator) and sometimes dense granules together with very small (a few micrometers of diameter) light particles. This fact, which is mostly a natural consequence of the flake breaking and/or granulating process, causes a bad flow-ability of the material and segregation (i.e. the more dense granules flow faster than the less dense) of the bulk during tabletting phase, with the result of rejecting complete batches, because of the bad uniformity content of the tablets.

To overcome the above mentioned problems, related to the dry granulation, in the art there are known some technical devices where the small/fine particles and sometimes also the most big particles produced in a normal roll compaction system (i.e. compactor and sieve granulator) are separated mechanically from the rest of the granules with the help of vibrating screen(s). This separation process is generally complicated (big sized sieves are generally needed), noisy and full of problems. In fact, it is very difficult to use, in a screen separator, a sieve whose openings are smaller than for instance 500 μm of diameter. This is because—due to well known physical phenomena—, the granulated material has (more or less, depending on the material) an adhering tendency which can often cause the obstruction of the sieve openings, arresting all the process or deteriorating the quality of the produced bulk.

An example of vibrator screens is the one indicated in the US Patent 20030187167 (see FIG. 1A).

As it is evident in the figure, the oversized particles and the fines are collected and transported to be compacted and dry granulated again. For separating the product (i.e. the good particles from the oversized and from the fines), vibrations are needed. The process can be continuous, when new material is continuously added to the particles to be recycled and if the sieve openings are not blocked. The recycling system of the FIG. 1A consists in mechanical horizontal and vertical screws.

Instead of using vibrating screen separators, one can separate the fine dusty particles from the acceptable granules with the help of a gas stream.

One example of this separation is disclosed in Patent WO 99/11261, where a Minox sieve type MTS 1 200 equipped with an air jet system is used. The air is escaping upwards from a rotating perforated blade fixed horizontal under the sieve. By this action the fine particles are blown off from the coarse particles and sucked downwards through the sieve to the receiver by the action of an under pressure.

Such kind of particle separation can be applied to a compaction process, by placing the Minox apparatus under the sieve granulator, where the flakes/ribbons are broken into granules and passed through a screen. In this case, the screen of the sieve granulator must have opening dimensions that represent the maximum dimension size of the acceptable particles. The apparatus will collect the "acceptable" granules while the very small particles can be "recycled" by conveying them pneumatically (i.e. via air stream) or mechanically to be compacted again. In Patent WO 99/11261 the minimum size of the acceptable particles is indicated in 125 µm. This means that the openings of the screen of the Minox apparatus are sized 125 µm. The maximum size of the particles is indicated between 2.0 and 1.0 mm. As indicated in the Patent WO 99/11261, the sieve applied in the above mentioned Minox apparatus has a pretty big diameter (120 cm), if the granulation of Amoxicillin trihydrate powder is carried out with a roller compactor type Chilsonator 4L×10D (diameter of rolls: 25.4 cm) and the applied roll pressure is 1100 psi.

The results of the above mentioned air separation seem to be very much related to the quality of the material to be granulated and to the compaction pressure, while the efficiency of the process (i.e. the quantity of product per hour) can be also influenced from the dimensions of the openings of the screen, from the diameter of the screen and from the quantity of the air passing through the screen. Problems can be predicted with sticky materials, and/or when the openings of the screen are too little and/or the diameter of the screen is not big enough and/or when the applied roll pressure is very little.

Another example of air separation is indicated in Patent GB 1567204, where dusty particles mixed with air are introduced tangentially in a guide helix of a cylindrical hollow body and are guided along the wall of a cylindrical surface on an air cushion. The fine material leaves the cylindrical hollow body axially via discharge pipes whereas the coarse material occurs in the coarse material discharge pipe (see FIG. 1B). As it is evident in the figure, in Patent GB 1567204 the cylindrical surface (4) is equipped with discharge openings (3) into which air is guided from fluid inflow pipes (1) via a distribution chamber (2). The final material leaves the cylindrical hollow body (5) axially via discharge pipes (8) for fluidised material, whereas the coarse material occurs in the coarse material discharge pipe (9).

Even Patent WO 2008/056021 provides a dry granulation method where the fine particles are separated from the granules by entering the fine particles in a gas stream. According to such patent, the gas stream may be directed through a fractioning chamber and separates at least some fine particles from the granules. The fine particles may then be returned to the system for immediate re-processing or they may be placed into a container for later re-processing. The fractioning chamber described in Patent WO 2008/056021 may comprise means to guide a gas stream into the fractioning means, means to put the compacted mass into motion and means to guide removed fine particles entrained in the gas stream from the fractioning means, e.g. for re-processing. One of the drawings presented in the patent is the one presented in FIG. 10 of the present application: the separation of granules from fines is produced in a cylindrical surface (401), equipped with openings and guide helix. The material is introduced from the opening (405), the fines go out from opening (409) and the granules leave the chamber via discharge pipe (407). Air is coming from the opening (406) and leaves the chamber from opening (408). As explained in the same patent, "instead of relying on the mesh size in the sieving, the fractioning device of the invention relies on the gas stream's ability to entrain fine particles from the moving compacted mass. The determination of the size of acceptable granules is achieved by balancing their gravitational force (together with other forces, e.g. mechanical and centrifugal forces) against the force of the gas stream". In such separation system, the direction of the flow of the gas stream must have a component which is contrary to that of the direction of flow of the compacted mass.

The quality of the granules obtained in a dry granulation process where gas separators are used is generally supposed to be good under the aspect of flow-ability and of the homogeneity of the produced bulk. Particularly, in Patent WO 99/11261 is presented a process which, between other advantages "allows for disintegration of dosage forms into primary drug particles followed by a high dissolution rate because no binders have been used". In Patent WO 2008/056021 is presented a process where the porosity of the granules (obtained mostly using low compaction pressures) is supposed to have a very relevant importance for the disintegration and the tensile strength of the tablets. In the same Patent WO 2008/056021 it is asserted (Page 23, 4-6) that the patent provides tablets which "may have at least two or three of the following properties: high tensile strength, high drug load, low amount of lubricant, quick disintegration time and insensitivity to storage time".

According to the same Patent WO 2008/056021, the product of the process of the invention is influenced by triboelectric phenomena, with the final effect of an enlargement of the granules. In Patent WO 2008/056021 such agglomeration phenomena are supposed to happen in the fractioning device and are due to the fact that the carrier gas flows in a direction that is different from the flow of accepted granules (Patent WO 2008/056021, page 42, 19-24, page 43, 21-22 and page 44, 1-2).

When the gas is used in the prior art and in a dry granulation system (described e.g. in the above mentioned Patent WO 99/11261 and Patent WO 2008/056021) for getting granules of better flow-ability, better porosity and, in some particular cases, of a larger size, the quantity of the gas to be used must evidently be regulated following parameters which are mostly related to the density of the material to be processed and to the structure of the system (e.g. sieve dimension, compaction force, efficiency of the granulator etc.). It is very evident that the required quantity of the gas to be used in the above mentioned air separator systems must be chosen "a posteriori", after some experiments and taken into account all the other parameters used in the granulation, e.g. the density of the granules and the efficiency of the system. Every variation of the quantity of the used gas can create lack of balance in the granulation system, with consequences e.g. on the homogeneity of the granulated bulk, on the porosity of the granules, on the efficiency of all the system and on the flow-ability of the bulk. For this reason no one of the dry granulation methods presented in the actually known prior art is defining the quantity of the gas to be used in a granulation process as a parameter to be chosen "a priori", i.e. as the most important parameter from which depends the choose of the other granulation parameters.

The direction of the gas stream is also taken into account, in the prior art, for the only purpose of getting granulation results that guaranty mostly the homogeneity of the granulated bulk, the porosity of the granules, the efficiency of all the system and on the flow-ability of the bulk.

The phenomena related to a gas stream which carries up a powdered bulk (e.g. triboelectrification phenomena) are generally considered in a negative way, due mostly to the risks of explosions and to the apparent necessity of avoiding the possible creation of granules electrically charged (which could have bad influence on the flow-ability of the product). Triboelectrification can anyhow enhance the enlargement of the granules, as indicated in Patent WO 2008/056021.

According to the inventor of this invention, the phenomena related to a gas stream which carries up a powdered bulk can have many positive effects on the final quality of the granules, above all from the point of view of the disintegration of granules and tablets and on the bioavailability of the tablets. Such positive effects can be obtained with an innovative granulation system, where the quantity and the direction of the gas are strictly controlled and are considered the very important parameters in the system. Due to the importance of the gas stream in this invention, we can define this innovative granulation system as an "Aerodynamic granulation system".

Essentially contrary to what is taught in Patent WO 2008/056021, according to the present invention the enlargement of the granules, due to the triboelectric effects, does not take part only or above all in the fractioning device and does not depend essentially from the fact that the carrier gas flows in a direction that is different from the flow of the accepted granules. The inventor believes that such granules enlargement takes part potentially in every part of the apparatus, which is in contact with gas, and reaches its final status when the produced bulk is mixed up, after the end of the dry granulation process. Also according to this invention triboelectric effects can be controlled, when necessary, with the help of an electromagnetic field.

Also, basically differently to what is taught in Patent WO 2008/056021, according to this invention the porosity of the granules is enhanced from the fact that the powders entering the compaction chamber are electrically charged. This means that the compaction pressure, even if regulated a bit higher than necessary in a normal process, may produce a ribbon which is suitable for producing porous granules at the granulation stage.

The porosity of the granules are also enhanced from the fact that—contrary to what is needed in Patent WO 2008/056021—in an apparatus conform to the present invention the gas stream enters also the compaction chamber, as well as the granulator device.

According to the present invention, many important qualities of the manufactured granules and of the tablets, produced from a bulk obtained in a production method conform to the present invention, are directly related to the quantity of the gas used in the granulation stage. Such qualities concern mostly the disintegration of the granules into water, the hardness of the tablets, and also the bioavailability of the tablets.

SUMMARY OF THE INVENTION

The present invention provides a dry granulation method and apparatus, operating under the influence of a gas stream, for producing granules from a powdered bulk. The produced granules are characterized in that their quality is directly related to the direction and quantity of the gas stream used in the process. In the present invention are also described the techniques necessary for controlling the flow of the gas (quantity and direction) in every part of the production apparatus.

The inventor has discovered that in a dry granulation process, where the bulk is conveyed pneumatically and the carrier gas is used also for separating "dust" or small particles from granules (as for instance in patents WO 99/11261, GB 1567204 and WO 2008/056021), the direction and the quantity of the gas stream have a very big importance on the final quality of the product, especially under the point of view of homogeneity, stability and reproduction of the results. Thus, at the tabletting stage, a bulk can give better or worse results (hardness, disintegration, friability, bio-availability of the tablets etc.) depending on the quantity of the gas which has been used during the process and on the direction of the gas flow.

According to this invention, it is provided a method for dry-granulating a solid bulk, basically in absence of water or other liquids, using a normal dry-granulation device (e.g. roll compactor and granulator) and preferably (but not only) a negative gas stream, which is used not only for separating granules from fine particles, but also as a carrier for transporting the material inside almost all the parts of the system and for guarantying the homogeneity and the reproduction of the final quality of the produced bulk.

The invention provides also a dry granulation apparatus where the gas stream, used for transporting the powdered bulk and for separating the fine dusty particles from the acceptable granules, has a constant flow and a direction which is the same as the direction of the powdered bulk moving inside the granulation system.

According to the invention, a special gas fractioning device is used in the process, in order to guaranty the quality of the produced granules, under the aspect of flow-ability, and to control the direction of the gas stream.

To guaranty the homogeneity of the bulk, under the aspect of particle size distribution, the process uses preferably conical hammer sieve granulators.

To guaranty the flow direction of the gas stream, the compensation gas is guided inside the system through an opening located in the compaction chamber and the fractioning device is shaped in a way that a possible return of gas inside the system is avoided or limited when the accepted product leaves the apparatus.

To guaranty the stability of the flow of the gas stream in all the phases of the process, special combinations cyclone/expansion bin and a valve system are used.

To guaranty the quality of the final bulk for special delicate materials, where a normal gas stream could generate not desired electrical charges, special gas can be used, with possibly pre-humidification or heating.

To prevent, to limit or to increase electrical charges, also an electromagnetic field can be used.

The process is typically run as a continuous process and can be easily applied to almost all the powder substances (API and/or excipients or API alone) usable in the pharmaceutical, chemical and other industries.

The gas stream can consist on air or another gas (e.g. nitrogen, humidified air/gas, dried air/gas, heated air/gas, compressed air/gas, carbon dioxide, noble gas etc.) which enter the system from one determined point located on the upper part of the dry granulation/compaction chamber.

The fact that the process does not need essentially air from the environment of the granulation place, is another very important aspect of this invention. "Room" air can be easily compensate with another gas or with humidified, heated or dried air/gas, and this gives the possibility of dry-granulating even very sensible substances and/or the possibility of enhancing the quality of the product when drier, warmer or humid process conditions may be favourable to the results of the granulation.

The eventual use of compressed air/gas, fed through a point located on the upper part of the dry granulation/compaction chamber, in some particular process can enhance the flow of the bulk inside some parts of the system. At the end of the process, the same compressed air/gas can be easily used for dry cleaning devices and pipelines.

DETAILED DESCRIPTION OF THE INVENTION

The present invention uses a commercially available dry granulation device (like for instance Alexanderwerk Type WP 50N/75), provided with a suitable flake breaker and a granulator (preferably a conical mill, like Quadro Comil). All these devices are commercially available and can work as a normal dry granulation system, as indicated e.g. in the attached FIG. 2A: the bulk to be granulated flow down from the feed bin 1 to the screw feeder box 2, from where it is pushed forward to enter the compaction chamber 3, where the rolls compress the bulk into ribbons. The ribbons are then broken in the flake breaker device 4, from where the small flakes flow down to the granulation device 5, provided generally with oscillating or rotating hammers and sieve(s). The produced granules are then collected in a bin 6. As known in the prior art, such granules are generally not homogeneous, which can create problems at the tabletting stage.

According to the present invention, the above mentioned granulation devices must be connected with a system (pipelines, suction fan, gas separators, valves, fractioning device and if necessary an electromagnetic field) producing a gas stream, preferably negative, which is able to convey the powders to be granulated and to separate, in a special fractioning device, the acceptable granules from smaller particles, enhancing the flow-ability of the produced bulk. The invention also provides the necessary techniques for keeping constant the flow of the gas stream and its direction.

Figure 4:
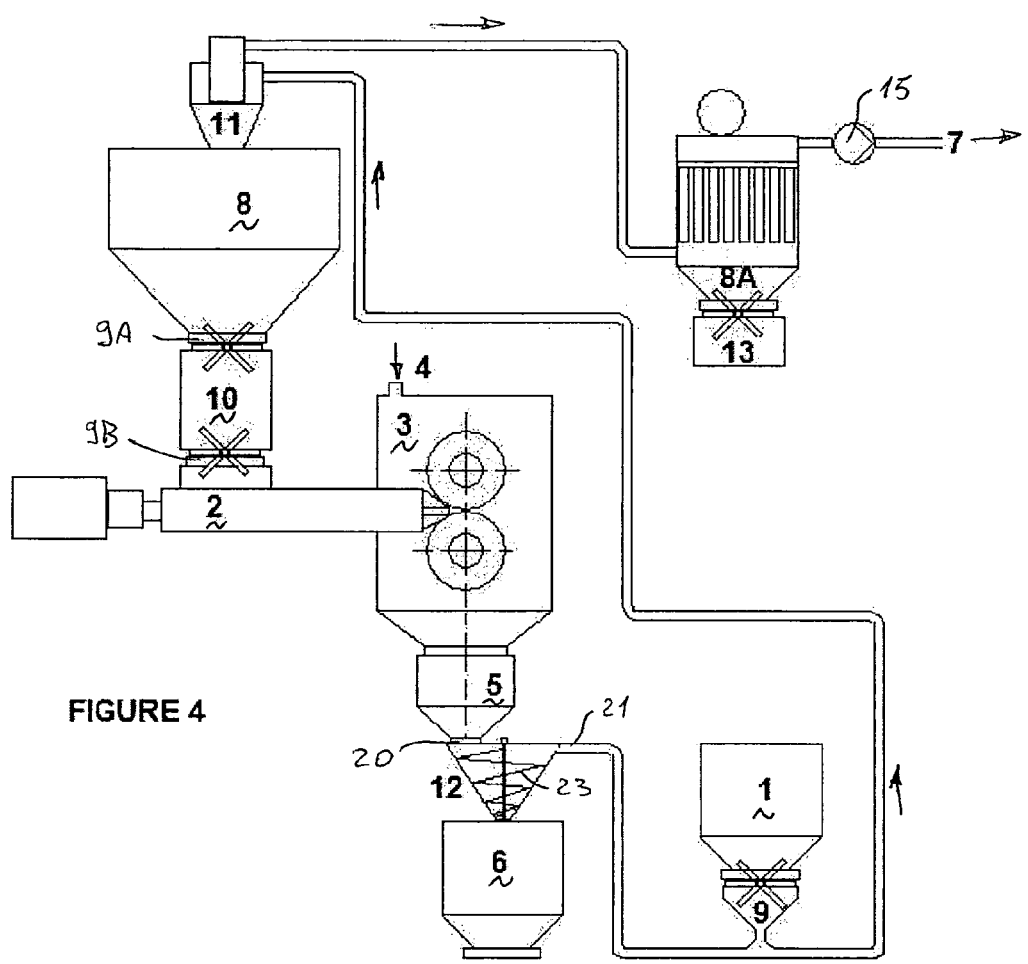

An apparatus which can operate according to this invention is the one claimed in claim 1 and described in the attached FIG. 4:

The gas enters the system from the opening 4 located in the highest part of the compaction chamber 3 and is dragged through the granulator 5, the fractioning device 12, a special cyclone 11 and a filter system 8A to a fan 15, which, in case of a negative gas stream, is at the origin of the gas flow.

In such system the bulk to be compacted 1, the fine particles to be compacted again and the compacted bulk have the same flow direction than the carrier gas. The quantity of gas entering the system can be kept constant in every moment of the process and without gas shocks, thanks to special technical solutions illustrated in a later part of this invention.

Due to its complete or partial impermeability to the environment, the structure of the apparatus of the invention makes also possible the use of a gas different from normal air. This is important to keep on mind, if the bulk is sensitive to oxygen or if dried air/gas could give better production results. In some cases, also the use of humidified air/gas or hot air/gas could be profitable for the product.

The diameter of the tubes used in the system is generally related to the dimensions of all the apparatus. Normally, for the pharmaceutical production of common batches (100-1000 kg), the tubes have a diameter of about 50 mm, and their material can be stainless steel or other pharmaceutically acceptable plastic material. For cleaning needs, the pipeline must be composed with very short pieces (ca. 1 m each), in the case that stainless steel is used, or short pieces (ca. 2 m) in other cases. When choosing the pipeline material, it has to be remembered its influence on the triboelectrical effects generated when the powdered bulk is conveyed through the line. The choice depends above all on the kind of material to be processed. Generally plastic material, connected to the earth, is suitable for most of the purposes.

It is evident that the position and the opening of the source of the compensation gas 4 has very big influence on the direction and also on the quantity of the originated gas stream. Furthermore, the position of the source of the compensation gas, according to the invention, makes possible and easy to introduce, in the system, a compensation gas which can be composed, for instance and if needed, of nitrogen, carbon dioxide, a noble gas, humidified air/gas, dried air/gas, air/gas pressured, etc. Such possibility cannot be achieved (or are achieved with big problems) in the other gas guided equivalent systems known in the art (e.g. Patent n. WO 2008/056021, Patent WO 99/11261 and Patent GB 1567204).

According to the present invention, the location of the gas compensation/income opening 4 gives also the possibility for all the dry granulation system to be influenced from the gas stream. This influence is important when considering the triboelectrical effects and the situation created inside the compaction chamber 3 and inside the granulator device 5, where the gas flow, preferably in form of vacuum, will reduce the presence of dust and facilitate the flow of the compacted bulk into the fractioning device.

Furthermore, the inventor believes that the presence of gas flow inside the compaction chamber and in a direction which is the same of the one of the produced bulk, may improve the quality of the flakes.

In patent n. WO 2008/056021 (FIG. 1A and FIG. 1B) the source for the compensation gas is located in a place (indicated with number 105) which makes theoretically impossible the flow of gas through the compaction chamber and the granulator device. This means that the gas stream has practically no contact at all with the most important parts of the compaction devices. Obviously, in Patent WO 2008/056021, gas stream is used especially for separating the granules from the small particles and (but not necessarily) for carrying the bulk, as explained in the same patent.

The same as for Patent WO 2008/056021 can be said regarding the function and the direction of the gas flow in Patent WO 99/11261 and in Patent GB 1567204.

According to the present invention (FIG. 4), in the machine (usually a roll compactor) for the densification of the powders (screw-feeder—2—and compaction chamber—3) the compaction pressure to be used is determined from the quality of the bulk to be granulated, as known in the art. In fact, even if high pressures have to be avoided and even if low pressures have to be preferred, some materials require more compression pressure than others in order to be compressed into ribbons or flakes. This aspect of the invention is essentially different from what has been presented in patent WO 2008/056021, where a low compaction force must be applied to the powders, in order to have porous granules.

Instead of trying to use low pressures even with difficult materials, whose compressibility is bad, the inventor thinks that it is better to use better formulations, in order to have good ribbons and granules capable to stand the stress in the granulator 5 and inside the gas stream.

Furthermore, according to this invention, the porosity of the granules is relevantly enhanced from the fact that part of the powders entering the compaction chamber are electrically charged and this means that the compaction pressure, even if regulated a bit higher than necessary in a normal process, may produce a ribbon which is suitable for producing porous granules at the granulation stage.

According to this invention, the ribbons are broken into smaller pieces in a flake breaker and then "sucked" into a granulator 5, where the flake pieces are broken into granules. A granulator preferred in this invention is a conical mill, like Quadro Comil.

The use of such type of granulators in dry compaction system is generally not common in those compaction devices, where vacuum is used partially or is not used at all. In fact, in absence of a suitably directed and suitably strong gas stream and in absence of a gas fractioning device, the conical mills might create a lot of dust and stress the compacted flake pieces.

On the contrary, the use of conical mills in an apparatus conform to the present invention can enhance the quality of the granules and the efficiency of the granulator, in the sense that the granules are more round shaped and sieves with very small openings can be used even in the eventual case that, due to higher compaction pressure, the flake pieces might be not very soft. The use of small openings can also enhance the homogeneity of the bulk.

The direction of the gas stream, from up down to the fractioning device, makes possible the best utilizing of the conical mills, as evident to a person skilled in the art.

The use of conical mills in other apparatus, like e.g. the ones presented in Patent WO 2008/056021, Patent WO 99/11261 and in Patent GB 1567204, is extremely difficult, due above all to the direction of the gas stream supposed/required for such patents.

According to this invention, a special gas separator 12, (FIG. 4), is used in the process, for separating the granules from the fine particles, in order to guaranty the quality of the produced granules, under the aspect of flow-ability, and to control the direction and the quantity of the gas stream.

A type of gas separator (so called fractioning device), preferred in this invention, consists in a cylinder or cone or a combination of them.

According to the present invention, the quantity of gas coming inside the fractioning device must be strictly controlled in order not to influence too much the total quantity of gas stream circulating inside the system. For this reason, a suitable fractioning device may be e.g. the one described in FIG. 3B: the compensation gas, together with the powdered bulk 20, is "sucked" inside the fractioning device where the finest particles (or part of them) are entrained from the carrier gas 21 and conveyed, together with other material, to the beginning of the granulating system, to be processed again, while the accepted granules fall down because of the gravity and/or are transported down with the possible help of a spiral structure 23. The final product leaves the fractioning device through the opening 22, which may be provided with valves 24A, 24B for avoiding that compensation gas comes inside the system from said discharge opening 22, and this can be preferable if the carrier gas is other than normal air (e.g. nitrogen gas, dried, heated or humidified air/gas). If the carrier gas is normal room air, the discharge opening may be controlled in order to let that a very small quantity of air comes inside the system; this quantity depends on the quality of the powders and on the strength of the turbulences created from the operations of the spiral structure.

As known in the art, other parameters can influence the efficiency of this fractioning device, as for instance the conformation of the device and the location of the gas discharge opening (21).

According to the invention, there are many other alternatives for fractioning devices, which may be suitable for this invention. In order to be conform to the principle of this invention, regarding above all the reproducibility of the results, these devices must operate in a continuous and even gas stream and must have a strict control for the quantity of compensation gas eventually coming inside the system from the granules discharge opening. An example is the one presented in attached FIG. 3C, where the device indicated in Patent GB 1567204 is adapted to the requirements of the present invention: the compensation gas, together with the powdered bulk 20, is sucked inside the fractioning device where the finest particles (or part of them) are entrained from the carrier gas 21 to be processed again, while the accepted granules are transported to the granules discharge opening 22 with the help of a spiral structure 23. The final product leaves the fractioning device through the opening 22, which may be provided with a series of two valves 24A, 24B, for avoiding that compensation gas comes from the discharge opening 22, and this can be preferable if the carrier gas is other than normal air (e.g. nitrogen gas or humidified air/gas). If the carrier gas is normal room air, the discharge opening may be controlled in order to let that a very small quantity of air comes inside the system; this quantity depends on the quality of the powders and on the strength of the turbulences created from the operations of the spiral structure. As known in the art, other parameters can influence the efficiency of this fractioning device, as for instance the conformation of the device and the location of the gas discharge opening 21.

Figure 3A:
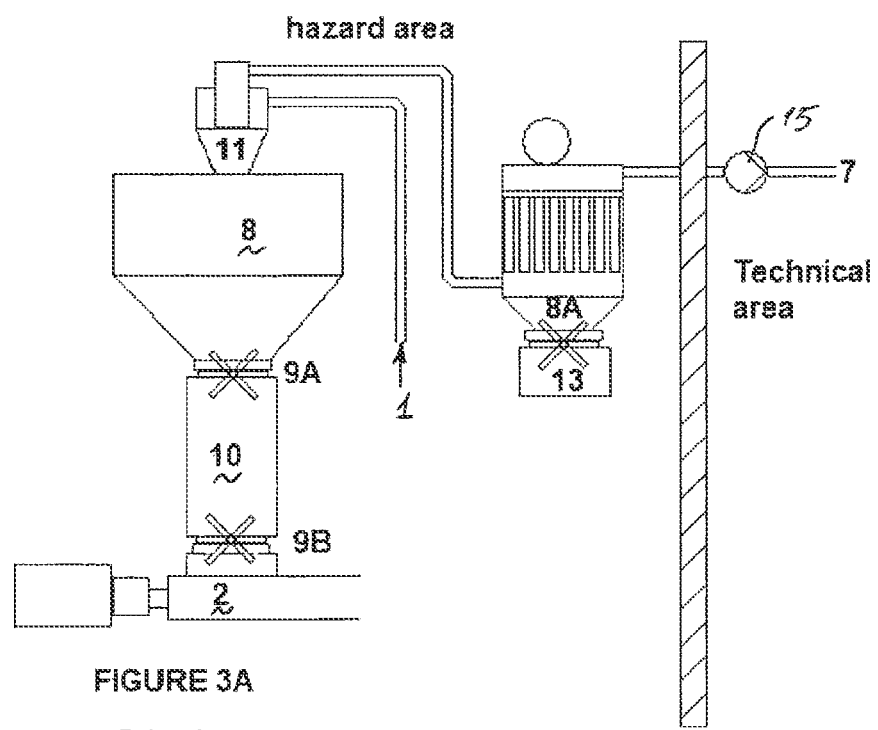
Figure 3B:
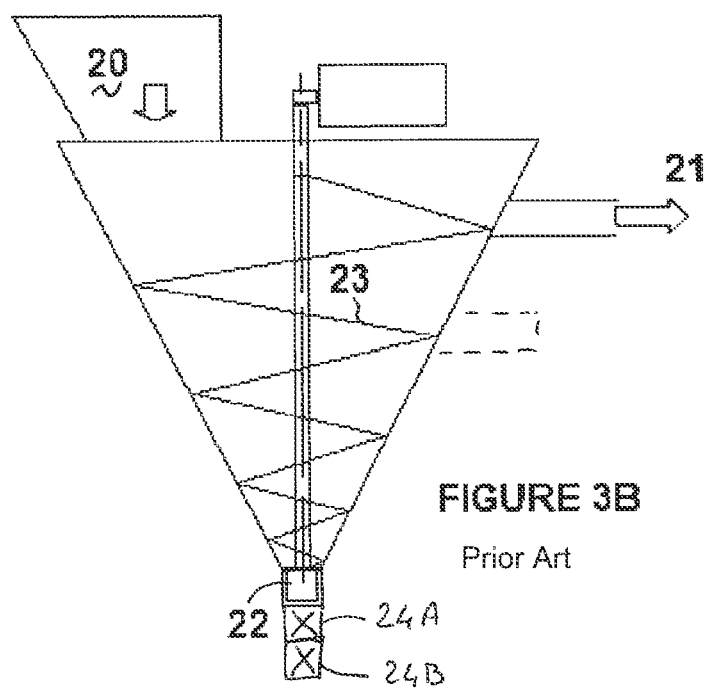
Figure 3C:
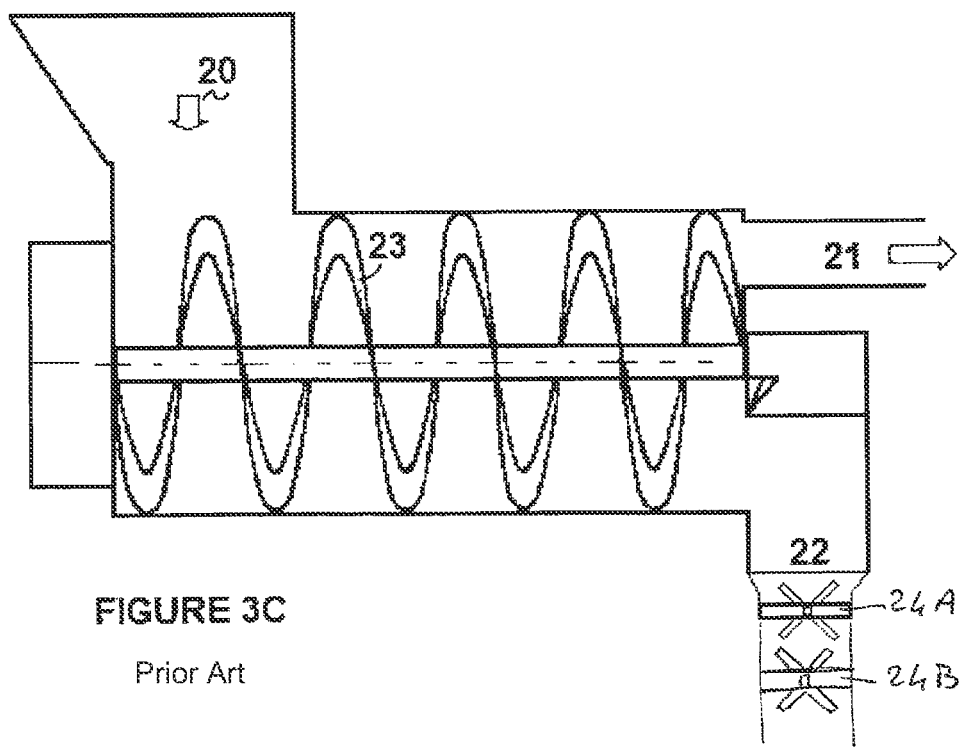

The device presented in FIG. 3C and other equivalent devices could be connected, when necessary or useful, to an electromagnetic field, whose location and connection can be easily planned from persons expert in the Art. The electromagnetic field(s) could be useful in some cases and for some particular materials, in order to govern better the electric charges of the particles moving inside the fractioning device and/or inside the system.

Figure 2A:
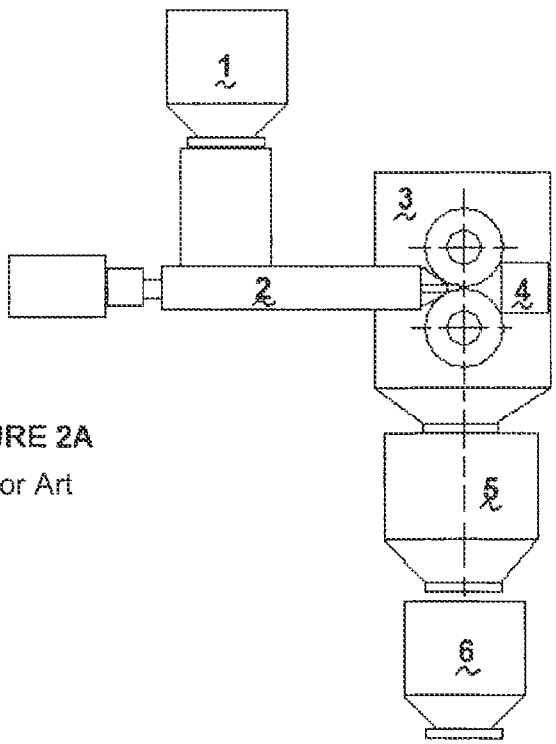
Figure 2B:
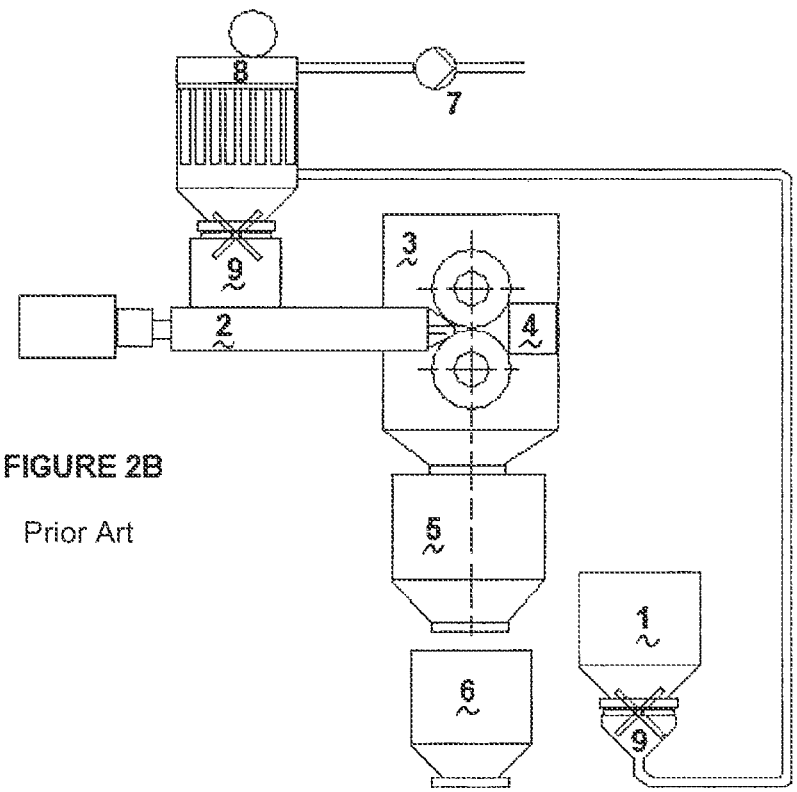

Typically, in the art, a vacuum can be created inside the dry granulation system as presented in FIG. 2B: The negative gas stream, created from the suction fan 7 will convey the material to be compacted from the feed bin 1 up to a gas separator 8 provided with filters and gas shock for cleaning the filters. The opening of the valves 9 makes possible the control of the system. Particularly, the valve located under the gas separator 8 is closed during the pneumatic conveying and opens only when the filters are cleaned. In such system, the compensation gas, which lets gas stream to be created, has to be found preferably from an aperture located at the feed bin.

It is evident that such dry granulation system, as presented in FIG. 2B, can operate continuously, even for many days. The quality of the granules (above all flow-ability), as explained in the background of this invention, can be enhanced with the use—for instance—of vibrating screen(s) (as in US Patent 20030187167), or of sieves equipped with an air jet system (as in Patent WO 99/11261). These separator devices can be located directly under the granulator 5 (see FIG. 2B), as a part of a continuous granulation process, or can be used at the end of the process, for improving the quality of the produced bulk.

According to the present invention, some special techniques must be introduced to the system described in FIG. 2B, in order to have a gas stream which is continuous, even and moves always in the same direction in all the dry granulation system and during all the process. In particular, according to the inventor, the interruption of the gas flow inside the system during the cleaning of the filters 8 and the discharging of the material from the filter area to the underlying screw feeder box, can be avoided by simply limiting essentially the use of the filters as gas/bulk separators. This is possible when replacing—in the hazard area—the filters with a special combination cyclone/expansion bin and using a system of valves to be located under the system cyclone/expansion bin.

The use of a cyclone without filters in the hazard area is not common at all in the pharmaceutical industry, where it is believed that lack of filters can bring to a big waste of product (depending on the powder particle size, this waste can be even 10-20%). According to this invention, this waste is limited to minimum when the above mentioned special combination cyclone/expansion bin and a system of valves to be located under the system cyclone/expansion bin are used.

Since this technical part of the invention is very important, in order to have a gas stream which is continuous, even and moves always in the same direction in all the dry granulation system and during all the process, we try to explain such technical solution with the help of FIG. 3A: the negative gas stream 7, originated in the technical area, entrains the powdered bulk 1 into the cyclone 11, where a vortex drags the powders and other particles into the bin 8 lying below. The gas, which is much lighter than the powders, is sucked to the technical area passing through a security filter system 8A, where the gas is cleaned up from possible residuals of powders.

The inventor has observed that, when the so called expansion bin 8 is at least 5-10 times bigger than the cyclone and when a system of valves 9A and 9B operates in order to avoid that compensation gas comes inside the system from the part of the screw feeder bin 10, the quantity of powders dragged to the filter system 8A is generally, depending on the particle size of the powdered bulk, less than 1% (mostly 0.1-0.4%). The valves preferred in this system are of the type star-shape (so called rotary valves). Such valves are not heavy, do not require electric energy and are turned alternately 180 (manufacturer, e.g. CO.RA, Lucca, Italy). Other technical solutions in the area described in FIG. 3A may regard the control of the pressure in the security filter system(s) 8A and the use of the material collected in the container 13. Such solutions, mostly related to the physical quality of the powdered bulk and to the cost of the material to be processed, can easily be found in the prior art.

The continuous operation at an "about" even gas flow rate described as a possibility in Patent WO 2008/056021 (see e.g. FIG. 1a and FIG. 1b of the patent), is difficult to be realized because compensation gas is evidently not constant (gas may come inside the system at intervals from valve 109 and from possible momentary openings in the granulation chamber). Furthermore, the intermediate vessel (107 in FIG. 1a and FIG. 1b of the Patent WO 2008/056021) has in Patent WO 2008/056021 the only evident function of containing the powders separated in the cyclone (106). The missing of the so called expansion bin (see FIG. 3A of the invention) may cause problems to the system described in Patent WO 2008/056021, in the sense that the cyclone, without a suitable expansion bin, does not work in a proper way as gas separator. The consequences of this fact on the stability of the gas stream can be evident for a person skilled in the art.

When a powdered bulk is conveyed in a gas stream, it is influenced from electron exchanges due to triboelectric effects. Such electron exchanges between the moving particles and the pipelines and other parts of the pneumatic system is a very well known effect in chemical and pharmaceutical industry, even because of the fact that the created potential difference can become so high to produce explosions or fires. For this reason, when a gas stream is used for moving solid particles, a very careful ground connection is required for the different parts of the system.

As known in the prior art, the polarity and the strength of the charges produced during the conveying of a powdered bulk in a gas stream, depend above all on the physical and chemical characteristics (above all particle size) of the powdered bulk and of the materials used in the conveying system (e.g. pipelines), on the roughness of the surfaces, on the temperature and on the type and the intensity of the conveying gas. Even the moving direction of the conveying gas has its big importance in the triboelectric phenomena: if such direction is contrary to that one of the moving particles (as for instance in Patent WO 2008/056021), the strength of the charges produced during the conveying is different than if the particles move in the same direction of the gas stream.

The electrostaticity, in a dry granulation process, where the powders and other particles are moved in a gas stream, plays a relevant role not only because electrostatic charges can create dangerous situations, but also because the discharging of the particles is never complete in all the phases of the granulation process. This basically means that the granules produced in a gas driven dry granulation system have some properties which differ from the properties of the granules produced without the influence of the gas stream. Such properties relate above all, in pharmaceutical applications, to the compressibility of the granules into tablets and to the disintegration and dissolution of granules and tablets.

According to the inventor, the above mentioned triboelectric effects, caused by passage of powder through the system, have not only the final effect of enlarging the size of the granules (as in Patent WO 2008/056021), but also the important one of influencing directly the compressibility of the granules into tablets and of enhancing the disintegration and the dissolution of the tablets and of the granules.

Without being limited from the theory, the inventor believes that, when a powdered bulk is conveyed in a gas stream and inside an apparatus conform to the present invention, many of the particles inside the product keep long time the form of slight dipoles.

When the dry granulation process, executed in conformity with the present invention, is over, the dipoles are often very well visible at the surface of the granulated bulk (some granules join each other in a sort of line-shaped long chain and some others show evident electrical charges).

Due to the successive mixing of the produced bulk, the granules find a position of apparent electrical stability, showing often a very porous surface.

Thus, according to the present invention, the enlargement of the granules, due to the triboelectric effects, does not happen only in the fractioning device (as supposed in Patent WO 2008/056021), but it takes part potentially in every part of the apparatus where the bulk is in contact with moving gas, and reaches its final status when the produced bulk is mixed up, after the end of the dry granulation process, as a consequence of a new structure between the granules (more or less charged).

Even if, after the mixing of the bulk, the total charge of each granule is apparently neutral (i.e. not positive nor negative), the flow-ability of the granulated bulk can be enhanced from the fact that the larger particles can attract the very small particles.

For the same reason, the flow-ability of a bulk prepared in the apparatus of the invention does not change much when the granulated bulk is mixed together with a small quantity of residual dust particles. Such particles could be e.g. the ones indicated in FIG. 3A, 13, of the attachments.

Depending on the composition of the bulk, at the tabletting stage the presence of the above mentioned charged particles, as the ones originated in an apparatus conformed to the invention, generally makes more difficult the compression of the granules into tablets, in the sense that bigger tablet compression forces must be used and also the tablet ejection forces may be very strong. This fact can be explained with the resistance of the electrical charges existing inside the particles.

Nevertheless, the produced tablets are mostly better in hardness than the tablets produced using a bulk prepared in a different dry granulation system.

This can depend, according to the inventor, from the particular structure of the granules obtained with the help of the gas stream.

In all the experiments made using a dry granulation apparatus conform to the present invention and different kinds of pharmaceutical acceptable API and/or excipients or excipients alone, the produced bulk has shown a good flow-ability and a good homogeneity, and this is due, according to the inventor, to the special gas separators used in the invention, to the controllability of the gas flow (quantity and direction) inside the system and also (in many cases) to the use of conical mills.

According to this invention, the compaction pressure used to produce granules has its importance, which is mostly related to the bulk formulation. This means that, as known in the art, in a dry granulation process the compaction pressure for compressing a determinate bulk should be regulated as low as possible; in order—anyhow—to produce a flake of a determinate thickness.

Also according to this invention, the triboelectric effects on the porosity of the ribbon produced in the compaction chamber have also to be taken into account.

Many experiments, made using a dry granulation apparatus conform to the present invention, have also shown that the compressibility into tablets of the produced bulk is better or less good depending on the quantity of gas used in the process.

In other experiments it has also been shown that the tablets, compressed from a bulk produced in a dry granulation apparatus conform to the present invention, have a disintegration into water which is—for a same bulk formulation—much faster or much slower depending on the quantity of the gas used in the process.

As a consequence of such observations, the inventor believes that the quantity, the quality and the direction of the gas stream, regarding all the parts of the apparatus in contact with the bulk, in a dry granulation process are parameters that can influence directly the quality of the granules and of the tablets and for this reason their strict control is essential for guarantying the homogeneity, stability and reproduction of the results.

DESCRIPTION OF THE ATTACHED DRAWINGS

FIG. 1A presents a granulating system (US Patent 20030187167) in which the oversized particles and the fines are collected and transported to be compacted and dry granulated again. For separating the product (i.e. the good particles from the oversized and from the fines), vibrations are needed in the sieve devices. The recycling system of the FIG. 1A consists in mechanical horizontal and vertical screws.

Figure 1B:
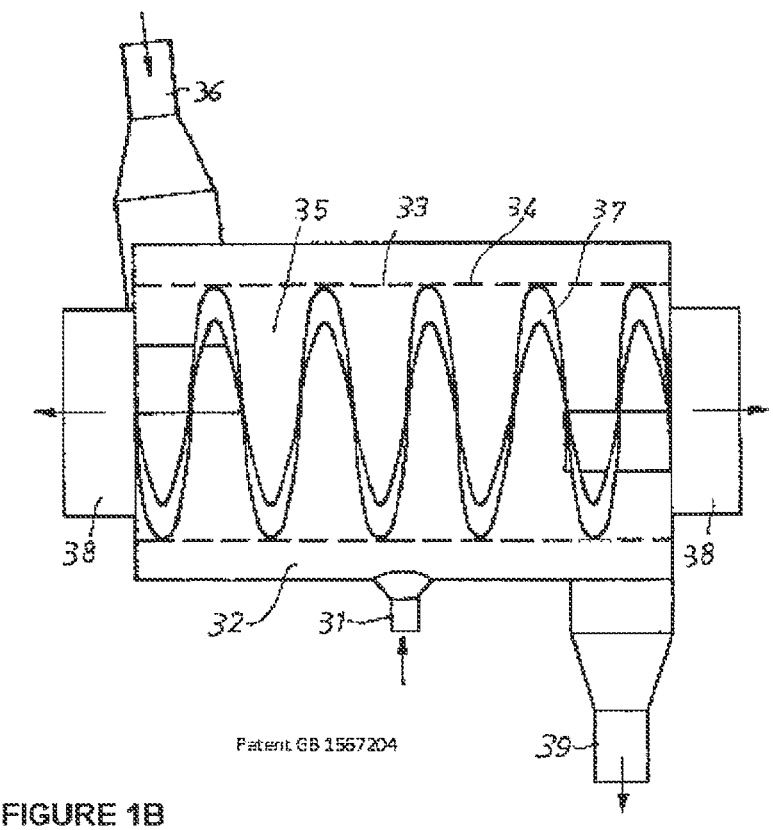

FIG. 1B presents a fractioning device (Patent GB 1567204) in which the cylindrical surface 4 is equipped with discharge openings 3 into which air is guided from fluid inflow pipes 1 via a distribution chamber 2. The final material leaves the cylindrical hollow body 5 axially via discharge pipes 8 for fluidised material, whereas the coarse material occurs in the coarse material discharge pipe 9.

Figure 1C:
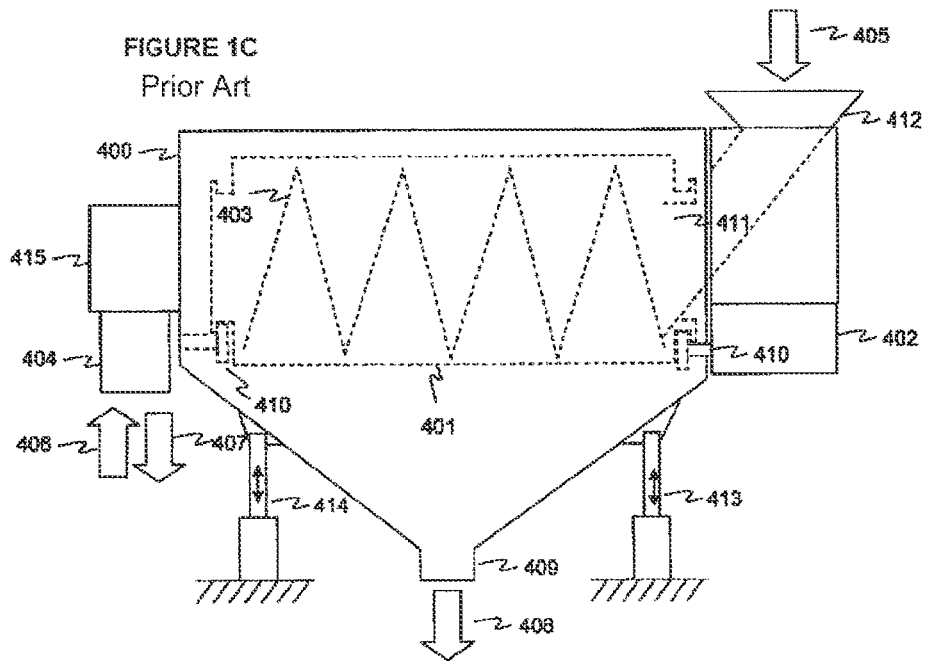

FIG. 1C presents one of the fractioning devices described in Patent WO 2008/056021. In this device the separation of granules from fines is produced in cylindrical surface 401, equipped with openings and guide helix. The material is introduced from the opening 405, the fines go out from opening 409 and the granules leaves the chamber via discharge pipe 407. Gas is coming from the opening 406 and leaves the chamber from opening 408.

FIG. 2A shows a representation of a normal dry granulation device (roll compactor), in which the bulk to be granulated flow down from the feed bin 1 to the screw feeder box 2, from where it is pushed forward to enter the compaction chamber 3), where the rolls compress the bulk into ribbons. The ribbons are then broken in the flake breaker device 4, from where the small flakes flow down to the granulation device 5, provided generally with oscillating or rotating hammers and sieve(s). The produced granules are then collected in a bin 6. As known in the prior art, such granules are generally not homogeneous, which can create problems at the tabletting stage.

FIG. 2B shows a representation of a gas guided normal dry granulation device (roll compactor) in which the negative gas stream, created from a suction fan 7 carries up the material to be compacted from the feed bin 1 up to an air separator 8 provided with filters and air shock for cleaning the filters. The opening of the valves 9 make possible the control of the system. Particularly, the valve located under the air separator is closed during the pneumatic conveying and opens only when the filters are cleaned. In such system the compensation gas, which lets gas stream to be created, has to be found preferably from an aperture located at the feed bin.

FIG. 3A shows some particulars of the apparatus which can be used in the invention. The negative gas stream 7, originated in the technical area, drags the powdered bulk 1 into the cyclone 11, where a vortex drags the powders and other particles into the bin 8 lying below. The gas, which is much lighter than the powders, is sucked to the technical area passing through a security filter system 8A, where the gas is cleaned up from possible residuals of powders. When the expansion bin 8 is at least 5-10 times bigger than the cyclone and when a system of valves 9A and 9B operates in order to avoid that compensation gas comes inside the system, the quantity of powders sucked to the filter system 8A is very low (depending on the particle size of the processed powdered bulk, ca. 0.1-0.4%).

FIG. 3B shows an exemplary fractioning device, which responds to the needs of this invention. In such fractioning device, the compensation gas, together with the powdered bulk 20, is sucked inside the fractioning chamber where the finest particles (or part of them) are entrained from the carrier gas 21 and conveyed, together with other material, to the beginning of the granulating system, to be processed again, while the accepted granules fall down because of the gravity and/or are transported down with the help of a spiral structure 23, which is facultative. The final product leaves the fractioning device through the opening 22, which may be provided with valves for avoiding that compensation gas comes inside the system from the discharge opening 22, and this can be preferable if the carrier gas is other than normal air (e.g. nitrogen gas or humidified air). If the carrier gas is normal room air, the discharge opening may be controlled in order to let that a very small quantity of air comes inside the system; this quantity depends also on the quality of the powders and on the strength of the turbulences created from the operations of the spiral structure (when used).

FIG. 3C shows an another exemplary fractioning device, which responds to the needs of this invention. In such fractioning device, the compensation gas, together with the powdered bulk 20, is sucked inside the fractioning device where the finest particles (or part of them) are entrained from the carrier gas 21 to be processed again, while the accepted granules are transported to the granules discharge opening 22 with the help of a spiral structure 23. The final product leaves the fractioning device through the opening 22, which may be provided with valves 24A,24B, for avoiding that compensation gas comes from the discharge opening 22, and this can be preferable if the carrier gas is other than normal air (e.g. nitrogen gas or humidified air). If the carrier gas is normal room air, the discharge opening may be controlled in order to let that a very small quantity of air comes inside the system; this quantity depends on the quality of the powders and on the strength of the turbulences created from the operations of the spiral structure.

FIG. 4 shows a method and apparatus conform to this invention. The gas enters the system from the opening 4 located in a part of the compaction chamber 3 and is dragged through the granulator 5, the fractioning device 12, a special cyclone 11 and a filter system 8A to a suction fan, which creates the gas stream.

In such system the bulk to be compacted 1, the fine particles to be compacted again and the compacted bulk have the same flow direction than the carrier gas. Due to its complete or partial impermeability, the structure of the apparatus of the invention makes also possible the use of a gas different from normal air. This is important to keep on mind, e.g. if the bulk is sensible to oxygen.

The invention claimed is:

1. A dry granulation apparatus for producing granules from a powdered bulk, comprising compacting means capable of producing compaction and granulation and fractioning means adapted to separate fine particles from acceptable granules by entraining the fine particles in a gas stream, wherein:
    the gas stream is entering into the apparatus from one aperture (4) located in the upper part of a compaction chamber (3), and is dragged through a granulator (5) to a fractioning device (12) wherein the separation of the acceptable granules from the fine particle happens;
    said fractioning device (12) is connected in an upper part to a pipe line where the fine particles are entrained in the carrier gas stream and conveyed to a filterless cyclone (11) together with the powdered bulk to be granulated coming from a feed bin (1), while the acceptable granules are collected in a bin (6), avoiding that air or other gas comes from outside the fractioning device when collecting the acceptable granules;
    said filterless cyclone (11), where a vortex drags the powdered bulk and the fine particles into an expansion bin (8) lying below, is connected in his upper part to a fan (15) which creates said gas stream, through a security filter system (8A), where the gas much lighter than the powders is cleaned up from possible residual powders, the bottom of said expansion bin (8) is connected with a vessel (10) from which the material to be compacted flow down to a feeder box from where it is pushed forward to enter the compaction chamber (3) where rolls compress the bulk into ribbons, there by obtaining that the bulk to be compacted from (1), and the fine particles to be compacted again have the same flow direction as the carrier gas stream and the total quantity of gas coming inside the apparatus during the process can be strictly controlled.

2. A dry granulation apparatus for producing granules from a powdered bulk, provided with gas, according to claim 1 wherein the granulation device (5) is provided with oscillating or rotating hammers and sieve(s) and the fractioning device (12) is a gas separator consisting in a cylinder or cone or parallelepiped or combination of them, for separating the acceptable granules which leaves said gas separator from the fine particles, which are entrained from the carrier gas stream through an opening (21).

3. A dry granulation apparatus for producing granules from a powdered bulk, provided with gas, according to claim 1 wherein in the fractioning device (12) the acceptable granules fall in the vessel (6) because of the gravity and/or are transported with the help of a spiral structure.

4. A dry granulation apparatus for producing granules from a powdered bulk, provided with gas, according to claim 1, wherein the volume of the said expansion bin (8) is at least 5-10 times bigger than the volume of the cyclone (11) and a system of valves (9A, 9B) operates alternatively in order to avoid that compensation gas comes inside the system when the mass to be compacted leaves the vessel (10).

5. A dry granulation apparatus for producing granules from a powdered bulk, provided with gas, according to claim 1, wherein an electromagnetic field is created around the fractioning device (12) in order to control the electrostatic phenomena happening inside the fractioning device.

6. A dry granulation apparatus for producing granules from a powdered bulk, provided with gas, according to claim 1, wherein the fractioning device (12) is provided with means to avoid that gas comes into the fractioning device from a passage for the acceptable granules.

7. A dry granulation apparatus according to claim 1 wherein the direction of the said gas stream is produced from a suction fan or from a combination of a blower and a suction fan.

8. A dry granulation apparatus according to claim 1, wherein the gas is air, or nitrogen or other inert gas, coming inside the system from the aperture in the compaction chamber.

9. A dry granulation apparatus according to claim 8, wherein the gas is compressed air/gas, or heated air/gas, or dried air/gas, or humidified air/gas, coming inside the system from the aperture in the compaction chamber.

10. A dry granulation apparatus according to claim 2, wherein the position of the opening (21) is variable in order to control the intensity of the outlet gas flow.

11. A method for producing granules from a powdered bulk through the apparatus according to claim 1, wherein an amount of gas in the gas stream is controlled by the rotating speed of the fan (15).

12. A method for producing granules from a powdered bulk through the apparatus according to claim 1, characterized in that the rotating speed of the fan (15) is controlled in order to maintain a suitable gas amount constant.

13. A method for producing granules from powdered bulk through the apparatus according to claim 1 characterized in that the amount of the material entrained from the carrier gas stream through the opening (21) is controlled varying the intensity of electromagnetic field of the fractioning device (12).

14. A method for producing granules from powdered bulk through the apparatus according to claim 1 characterized in that the separation of granules depends on the position of the openings (21) along the axis of the fractioning device (12).

15. A dry granulation method for continuous production of granules from a powdered bulk, entered in a gas stream, comprising the steps of compacting, granulating and fractioning through suitable connected compacting, granulating, and fractioning means for separating fine particles from acceptable granules, the method comprising streaming a gas into a gas inlet in an uppermost part of the compacting means, wherein a direction of the gas through the compacting, granulating, and fractioning means is the same as the powdered bulk flowing through the compacting, granulating, and fractioning means.

16. A method according to claim 15, wherein the gas is air, or nitrogen or other inert gas.

17. A method according to claim 16, wherein the gas is compressed air/gas, or heated air/gas, or dried air/gas, or humidified air/gas fed.

18. A method according to claim 15, wherein, for the control of the quantity of the gas flowing inside the system, a combination of a filterless cyclone with an expansion bin and a series of two valves are used to separate the gas from the powdered bulk.

19. A method according to claim 18 wherein the gas flowing inside the fractioning means is used for separating the produced granules from the fine particles.

20. A method according to claim 19 wherein inlet of gas from outside the system through the fractioning means is strictly controlled or completely avoided.

21. A method according to claim 15 wherein the fine particles, rejected in the fractioning means, are conveyed from the gas stream for being compacted again.

22. A method according to claim 15 wherein the powdered bulk to be compacted is conveyed pneumatically from a feed bin to an expansion bin and then to a collecting bin for being compacted.

23. A method according to claim 15 characterized in that, for a determinate formulation, the produced granules when compressed into tablets show an enhanced disintegration into water, and/or an enhanced hardness and/or an enhanced bioavailability that can be related to the quantity of gas used in the granulation process together with an electromagnetic device, which control the electric charges of the granules.

24. A dry granulation apparatus for producing granules from a powdered bulk, comprising:
a compaction chamber (3) having a gas stream inlet aperture (4) located in an uppermost part of the compaction chamber (3), the compaction chamber receiving and compacting fines and powdered bulk;
a granulator (5) downstream of the compaction chamber, the granulator receiving the gas stream conveying the compacted fines and powdered bulk from the compaction chamber (3) and forming granules from the compacted fines and powdered bulk;
a fractioning device (12) downstream of the granulator, the fractioning device receiving the gas stream from the granulator (5) and separating the granules from residual said fines and the gas stream;
a filterless cyclone (11) downstream of the fractioning device and that receives the gas stream and the fines entrained therein from the fractioning device (12) via a pipeline connected to an upper part of the fractioning device (12);
a feed bin (1) connected to the pipeline and holding the powdered bulk to be granulated, the gas stream in the pipeline being adapted to convey the powdered bulk from the feed bin with the fines from the fractioning device to the filterless cyclone (11), the filterless cyclone (11) being adapted to create a vortex that separates the gas stream from the fines and powdered bulk;
a collection bin (6) connected to the fractioning device (12) and being adapted to receive and collect the granules therefrom while keeping out gases from outside the fractioning device when collecting the granules;
an expansion bin (8) connected to the filterless cyclone (11) that receives the fines and powdered bulk from the filterless cyclone;
a further pipeline connected to an upper part of the filterless cyclone and that receives the gas stream therefrom;
a fan (15) connected to the further pipeline via a security filter (8A) that separates the gas stream from residual particles entrained therein, the fan being arranged to create the gas stream;
a vessel (10) connected to a bottom of the expansion bin and that receives the fines and powdered bulk therefrom; and
a feederbox (2) that conveys the fines and the powdered bulk from the vessel (10) to the compaction chamber (3),
wherein the compaction chamber (3), the granulator (5), the fractioning device (12), and the filterless cyclone (11) through which the gas stream flows with the powdered bulk entrained therein are arranged so that the gas stream is continuous in a same direction as a flow of the powdered bulk and a quantity of a gas in the gas stream is controlled.

* * * * *